UNITED STATES PATENT OFFICE.

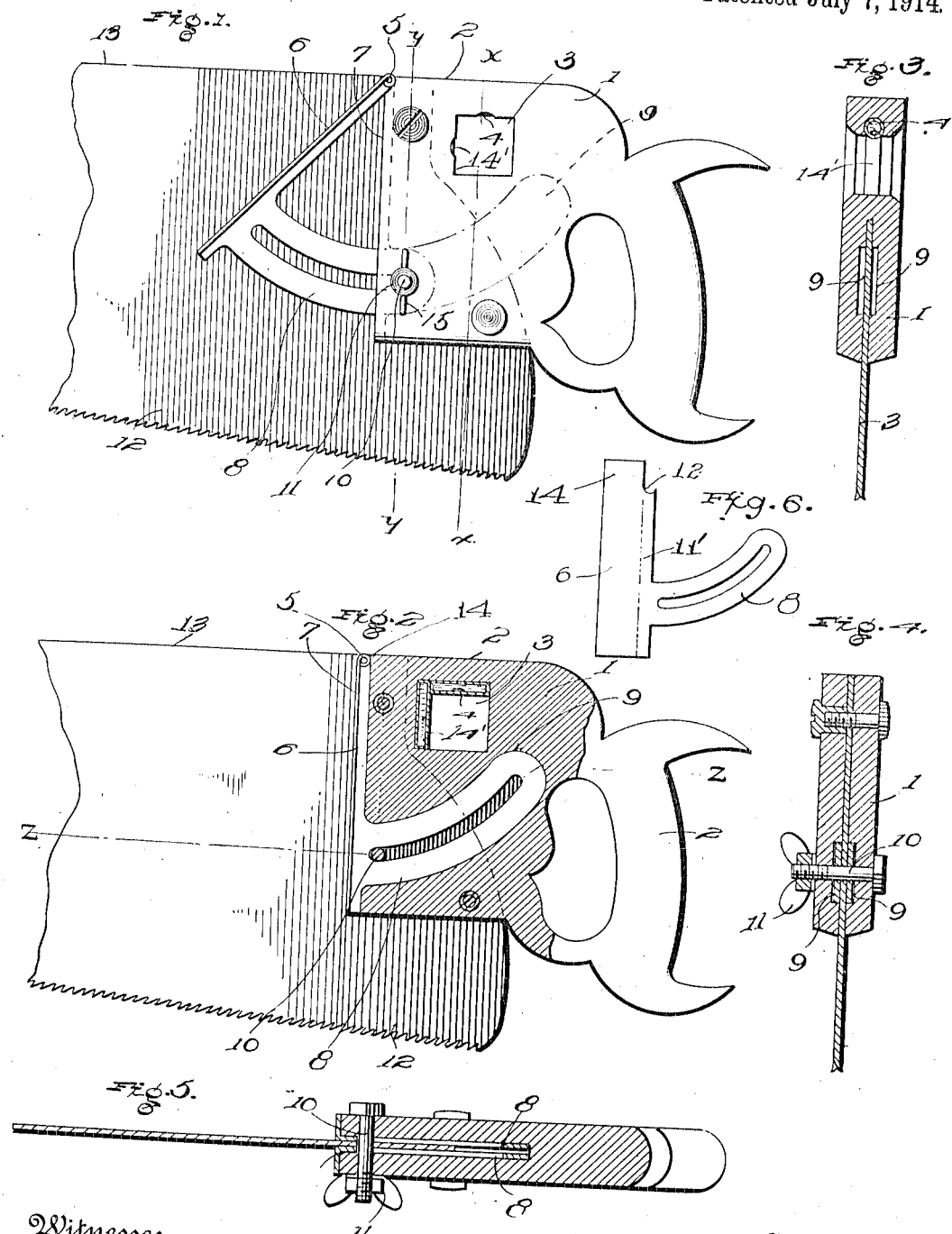

HALVOR PEDERSEN, OF JERSEY CITY, NEW JERSEY.

SAW-HANDLE.

1,102,293.  Specification of Letters Patent.  Patented July 7, 1914.

Application filed February 1, 1911. Serial No. 605,934.

*To all whom it may concern:*

Be it known that I, HALVOR PEDERSEN, a subject of the King of Norway, residing at Jersey City, county of Hudson, and State of New Jersey, have invented certain new and useful Improvements in Saw-Handles, of which the following is a specification, reference being had therein to the accompanying drawing.

This invention relates to a saw and has for its object the provision of a saw handle which can readily be attached to any hand saw having a straight back and which can be used with the saw blade in lieu of a square.

Another object of this invention is the provision of a blade which is formed from a blank and is so constructed as to engage the saw handle for constituting a measuring means.

With these and other objects in view, this invention consists of certain combinations, constructions and arrangements of parts as will be hereinafter fully described and claimed.

In the official drawings, Figure 1 is a view of a saw handle mounted on a saw and constructed in accordance with this invention. Fig. 2 is a view similar to Fig. 1, with a portion of the handle broken away and the blade in closed position. Fig. 3 is an end view in vertical section on the line X—X of Fig. 1. Fig. 4 is an end view in vertical section on the line Y—Y of Fig. 1. Fig. 5 is a section on the line Z—Z of Fig. 2. Fig. 6 is a plan view of the blank from which each blade is formed.

Referring to the accompanying drawing by numerals, it will be seen that there is provided a saw handle 1, having a longitudinal edge 2 and formed with an opening 3, one edge of which has located therein a spirit level 4 parallel with the edge 2. Hinged to a pin 5 at a corner of the saw handle at one end of the edge 2 are two blades. Each blade is formed from a blank comprising a body 6 which normally rests against the edge 7 of the saw handle. The body 6 is provided with a laterally-bent flange 11' having the upper portion thereof reduced to form a curved shoulder 12 while the body 6 is provided with an extended portion 14 leading beyond the shoulder, said extended portion 14 being coiled to form a pivot eye. The pin 5 passes through the pivot eye and in this manner pivotally supports the blade upon the handle, while the curved shoulder 12 rests upon the pivot eye for forming a reinforcement for preventing the pivot eye from springing open. The flange 11' is provided with an integrally formed curved slotted arm 8 which is normally located in the curved pocket 9 in the saw handle, and is adapted to slide into and out of the same and is held in adjusted position by means of the pin 10 and the wing nut 11, the pin 10 projecting through the handle and through the slot in the arm 8. The saw handle so constructed is secured to a straight back hand saw 12, the edge 2 being in alinement with the back edge 13 of the saw and each blade being movable over opposite sides of the saw blade.

The invention is used as follows: A carpenter putting in a window frame, in order to have it level and plumb, takes his saw, provided with a handle constructed in accordance with this invention, and rests the back of the saw against the window-sill and by means of the spirit level 4 is enabled to set the window-frame level and plumb. In order to also ascertain whether a piece of carpentry is plumb, the opening 3 has an edge adjacent and at a right angle to the edge in which is located the spirit level 14', which is employed as follows: Assuming a door frame is to be put in, the saw is placed with its back against the jamb and the frame moved until it is plumb and perpendicular which is ascertained by the spirit level 4. Now it is desired to put in the casing: one of the blades is pulled out of the handle as far as it will go, and as the workman has to reverse the angle for the corresponding piece, he pulls out the blade on the opposite side. By means of the blade, any other angle, no matter how slight, can be obtained. It will be seen that the blades used in combination with this device are so formed as to prevent any portion from becoming loose or broken, as each blade is formed from a single sheet of material and, therefore, all parts are integrally connected.

Having thus described the invention, what is claimed as new is:—

In a device of the class described, the combination with a handle, a saw blade carried thereby, said handle and blade provided with straight edges, of a plurality of blades carried by said handle, each blade formed from a blank and comprising a body provided with a laterally-bent flange, said flange provided at one end with a curved shoulder, said body provided with an extended portion coiled to form a pivot eye, said curved shoulder resting upon said pivot eye and forming a means for preventing the pivot eye from springing open, a pivot pin passing through said pivot eye and engaging said handle for pivotally supporting the blades, a slotted curved arm formed upon each body, said handle provided with curved pockets for the reception of said arms.

In testimony whereof I hereunto affix my signature in presence of two witnesses.

HALVOR PEDERSEN.

Witnesses:
 NILS ANDERSEN,
 ALEXANDER SEMPLE.